United States Patent [19]

Pappalardo et al.

[11] 4,306,173

[45] Dec. 15, 1981

[54] PHOSPHOR WITH EXTENDED FLUORESCENCE DECAY LIFETIME AND LAMP BASED THEREON

[75] Inventors: Romano G. Pappalardo, Sudbury, Mass.; Charles F. Chenot, Towanda, Pa.

[73] Assignees: GTE Laboratories Inc.; GTE Products Corporation, both of Waltham, Mass.

[21] Appl. No.: 135,951

[22] Filed: Mar. 31, 1980

[51] Int. Cl.³ .................... H01J 61/44; C09K 11/08
[52] U.S. Cl. .................... 313/486; 252/301.4 P; 252/301.6 P
[58] Field of Search .................... 313/486, 487; 252/301.4 P, 301.6 P

[56] References Cited

U.S. PATENT DOCUMENTS

| | | | |
|---|---|---|---|
| 2,619,471 | 11/1952 | Butler | 252/301.4 P |
| 2,774,738 | 12/1956 | Butler | 252/301.6 P |
| 2,776,261 | 1/1957 | Shaffer et al. | 252/301.6 P |
| 2,786,034 | 3/1957 | Butler | 252/301.4 P |
| 3,396,118 | 8/1968 | Datta | 252/301.4 P |
| 4,174,294 | 11/1979 | Murakami et al. | 252/301.4 P |
| 4,266,160 | 5/1981 | Chenot | 313/486 |

OTHER PUBLICATIONS

Kroger, *A Proof of the Associated-Pair Theory for Sensitized Luminophors*, Physica, XV (8–9), Sep. 1949, pp. 801–806.

Butler, *Alkaline Earth Orthophosphate Phosphors*, J. Electrochem. Soc., 100, May 1953, pp. 250–255.

Koelmans et al., *Luminescence of Modified Tin–Activated Strontium Orthophosphate*, J. Electrochem. Soc., 104, Jul. 1957, pp. 442–445.

Sarver et al., *Phase Equilibria and Tin-Activated Luminescence in Strontium Orthophosphate Systems*, J. Electrochem. Soc. 108, Dec. 1961, pp. 1103-1110.

*Primary Examiner*—Eugene R. LaRoche
*Attorney, Agent, or Firm*—Jerry F. Janssen

[57] ABSTRACT

A luminescent phosphor composition having enhanced luminescent decay lifetime consists essentially of a non-stoichiometric tin and manganese coactivated alkaline earth orthophosphate represented by the formula $$Sr_{(3-v-w-x-y-z)}\square_v Mg_w Ca_x (PO_2)_4 : Sn_y Mn_z$$

where
  $0.001 \leq v \leq 0.05$
  $0.180 \leq w \leq 0.35$
  $0 \leq x \leq 0.08$
  $0.015 \leq y \leq 0.05$
  $0.0005 \leq z \leq 0.0905$.

An improved fluorescent lamp employing the disclosed phosphor is also described.

10 Claims, 5 Drawing Figures

PHOSPHOR WITH EXTENDED FLUORESCENCE DECAY LIFETIME AND LAMP BASED THEREON

CROSS-REFERENCE TO RELATED APPLICATION

The subject matter of this application is related to the subject matter of application Ser. No. 135,605 filed concurrently herewith in the names of Romano G. Pappalardo and John Walsh, assigned to the assignee of the present invention.

BACKGROUND OF THE INVENTION

1. Field of the Invention

This invention relates to fluorescent phosphor materials. More particularly, it is concerned with non-stoichiometric modified strontium orthophosphate phosphors coactivated with tin and manganese.

2. Discussion of the Prior Art

Fluorescent phosphor materials employing a matrix of calcium or strontium orthophosphate have been the subject of some study.

For example, Kröger in *Physica,* 15:801 (1949) discusses the fluorescence of unmodified calcium or strontium orthophosphate phosphors coactivated with tin and manganese or with cerium and manganese.

Butler in *J. Electrochem. Soc.,* 100:250 (1953) describes alkaline earth orthophosphate phosphors activated with tin or with tin and manganese. The tin-manganese coactivated phosphors disclosed by Butler employ a calcium orthophosphate host matrix modified by the incorporation of some strontium.

Koelmans et al. in *J. Electrochem. Soc.,* 104:442 (1957) discuss tin activated strontium orthophosphate phosphors modified by the incorporation of aluminum, cadmium, calcium, magnesium, or zinc.

Sarver et al. in *J. Electrochem. Soc.,* 108:1103 (1961) discuss phase equilibrium relationships and luminescence of tin activated strontium orthophosphate phosphors modified with calcium, magnesium, or zinc.

Calcium or strontium orthophosphate phosphors which are activated by tin alone possess short fluorescent decay lifetimes. While short decay lifetime is a useful property of phosphors in some applications, it may lead to undesirable results in some instances as, for example, the flicker of fluorescent lamps which incorporate such phosphors. This flicker is a particular problem when fluorescent lamps are energized by alternating current of lower frequencies such as the 50 Hz. frequency common in European countries.

When additional ions are incorporated into tin activated calcium or strontium orthophosphate hosts, there is often a shift in the color of light emitted by the resultant phosphor upon excitation. This color shift can be undesirable when the choice of a phosphor for a particular application is based on the desired fluorescence color of tin.

OBJECTS OF THE INVENTION

It is therefore an object of the present invention to provide a tin-manganese coactivated phosphor having as its primary fluorescence the orange emission of tin, with secondary fluorescence contribution by manganese.

It is a further object of this invention to provide a phosphor having an extended fluorescence decay lifetime.

It is another object of the present invention to provide an improved fluorescent lamp.

SUMMARY OF THE INVENTION

In one aspect of the invention, a luminescent phosphor composition consists essentially of a non-stoichiometric tin and manganese coactivated alkaline earth orthophosphate represented by the formula:

where □ represents the non-stoichiometric factor and:
$0.001 \leq v \leq 0.05$
$0.180 \leq w \leq 0.35$
$0 \leq x \leq 0.08$
$0.015 \leq y \leq 0.05$
$0.005 \leq z \leq 0.0905$, the luminescent phosphor composition emitting orange emission when excited, and characterized by extended fluorescence decay lifetime.

In another aspect of the invention, a fluorescent lamp having diminished flicker when operated on alternating current comprises, in combination, a sealed light-transmitting tubular envelope, a discharge sustaining filling contained within the envelope, electrodes disposed within said envelope and operable when energized to sustain a discharge therebetween to generate ultraviolet radiations including a substantial proportion of 254 nm radiations, and a phosphor coating disposed on the interior surface of said envelope, said phosphor coating including a composition consisting essentially of a non-stoichiometric tin and manganese coactivated orthophosphate represented by the formula

where □ represents the non-stoichiometric factor and
$0.001 \leq v \leq 0.05$
$0.180 \leq w \leq 0.35$
$0 \leq x \leq 0.08$
$0.015 \leq y \leq 0.05$
$0.0005 \leq z \leq 0.0905$.

Figure 1:
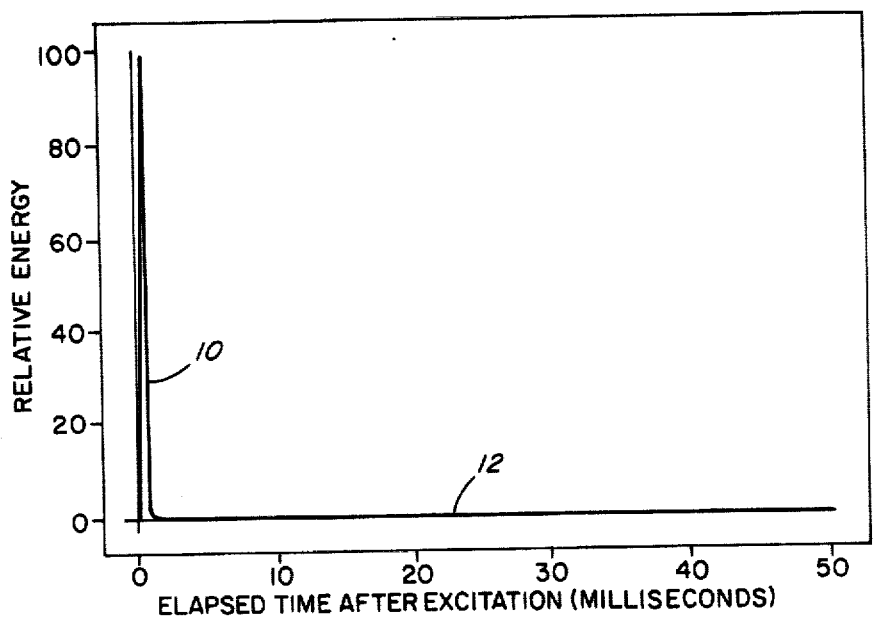
FIG. 1 is a plot of the emission versus time of a typical prior art tin activated strontium orthophosphate phosphor.

For a better understanding of the present invention, together with other and further objects, advantages and capabilities thereof, reference is made to the following disclosure and appended claims in connection with the above-described drawings.

DESCRIPTION OF THE PREFERRED EMBODIMENTS

Phosphors in accordance with the invention consist essentially of a modified strontium orthophosphate host matrix coactivated by the incorporation of tin and manganese ions. As used throughout this specification and claims, the term modified strontium orthophosphate means the normally less-stable high temperature crystalline modification of the compound, stabilized to room temperature by the addition of other alkaline earth cations. Pure strontium orthophosphate undergoes a rapid, reversible phase transition at 1305° C. between a high temperature and a low temperature crystalline modification. In phosphors in accordance with this invention, the host matrix consists essentially of the high temperature modification stabilized to room temperature by the incorporation of magnesium and calcium ions in the host lattice. Stabilization is achieved primarily by magnesium, with lesser amounts of calcium added to enhance the stabilizing effect of the magnesium.

The operable range of incorporation of magnesium into the strontium orthophosphate host for stabilization is between 0.180 and 0.35 atoms of magnesium per mole of alkaline earth orthophosphate. The preferred range of magnesium content for phosphor compositions of this invention is at the lower end of this range, generally from about 0.180 to 0.250 atoms of magnesium per mole of alkaline earth orthophosphate.

Additional stabilization of the high temperature crystalline modification of strontium orthophosphate is achieved by the incorporation of small amounts of calcium ion, generally in the range below about 0.08 atoms per mole of alkaline earth orthophosphate.

Stabilized, or modified, strontium orthophosphate activated by tin alone emits strongly in the orange region of the visible spectrum upon excitation, with lesser emission in the near ultraviolet blue region. Incorporation of small amounts of manganese ion into the phosphor, in accordance with the invention, gives rise to enhanced afterglow in the phosphor due to the slower fluorescence decay of manganese after excitation.

The operable range of tin content employed to activate phosphors of this invention is between about 0.015 and 0.05 atoms of tin per mole of alkaline earth orthophosphate. The degree of manganese ion incorporation for coactivating the phosphors of this invention is in the range of between about 0.0005 and 0.0905 atoms per mole of alkaline earth orthophosphate. The preferred manganese content, giving rise to significant enhancement of afterglow in phosphors of this invention with the least color shift from the emission of phosphors activated with tin alone, is between about 0.03 and 0.05 atoms of manganese per mole of alkaline earth orthophosphate, with optimum results obtained with the value of about 0.032.

EXAMPLES

A series of tin and manganese coactivated modified strontium orthophosphate phosphors having compositions in accordance with this invention were prepared. In each example the phosphor components were dry blended to achieve a homogeneous blend and then fired for about two hours at 1190°–1200° C. under a flowing gas atmosphere of 0.5–1.0% hydrogen in nitrogen. This atmosphere served to prevent excessive oxidation of $Sn^{+2}$ to $Sn^{+4}$ without concomitantly reducing $Sn^{+2}$ to metallic tin. The fired material was allowed to cool to <500° C. temperature in the reducing atmosphere and then to room temperature in air. The cooled material was subjected to further comminution to produce a fine powder. The relative molar amounts of each component used in the formulation of each example are given in Table 1.

TABLE 1

| EXAMPLE | COMPONENT (RELATIVE MOLAR AMOUNT) | | | | | |
|---|---|---|---|---|---|---|
| | $SrHPO_4$ | $SrCO_3$ | $MgCO_3$ | $CaCO_3$ | $SnO$ | $MnO$ |
| I | 2.000 | 0.573 | 0.285 | 0.076 | 0.020 | 0.0005 |
| II | 2.000 | 0.572 | 0.285 | 0.076 | 0.020 | 0.0010 |
| III | 2.000 | 0.571 | 0.285 | 0.076 | 0.020 | 0.0020 |
| IV | 2.000 | 0.569 | 0.285 | 0.076 | 0.020 | 0.0040 |
| V | 2.000 | 0.565 | 0.285 | 0.076 | 0.020 | 0.0080 |
| VI | 2.000 | 0.560 | 0.285 | 0.076 | 0.020 | 0.0160 |
| VII | 2.000 | 0.550 | 0.285 | 0.076 | 0.020 | 0.0230 |
| VIII | 2.000 | 0.541 | 0.285 | 0.076 | 0.020 | 0.0320 |
| IX | 2.000 | 0.528 | 0.285 | 0.076 | 0.020 | 0.0450 |
| X | 2.000 | 0.509 | 0.285 | 0.076 | 0.020 | 0.0640 |
| XI | 2.000 | 0.483 | 0.285 | 0.076 | 0.020 | 0.0905 |
| XII | 2.000 | 0.561 | 0.285 | 0.076 | — | 0.0320 |
| XIII | 2.000 | 0.519 | 0.285 | 0.076 | 0.020 | — |

The nominal formula of each example is given in Table 2. The non-stoichiometric factor was taken to be the difference between the sum of the cation content of each formulation, in atoms/mole, and the value 3. Ionic charge balance in the phosphors is probably maintained by the presence of some $Sn^{+4}$.

TABLE 2

| EXAMPLE | NOMINAL FORMULA* |
|---|---|
| I | $Sr_{2.573}\square_{0.0455}Mg_{0.285}Ca_{0.076}(PO_4)_2 : Sn_{0.020}Mn_{0.0005}$ |
| II | $Sr_{2.572}\square_{0.0460}Mg_{0.285}Ca_{0.076}(PO_2)_2 : Sn_{0.020}Mn_{0.001}$ |
| III | $Sr_{2.571}\square_{0.0460}Mg_{0.285}Ca_{0.076}(PO_4)_2 : Sn_{0.020}Mn_{0.002}$ |
| IV | $Sr_{2.569}\square_{0.0460}Mg_{0.285}Ca_{0.076}(PO_4)_2 : Sn_{0.020}Mn_{0.004}$ |
| V | $Sr_{2.565}\square_{0.0460}Mg_{0.285}Ca_{0.076}(PO_4)_2 : Sn_{0.020}Mn_{0.008}$ |
| VI | $Sr_{2.560}\square_{0.0430}Mg_{0.285}Ca_{0.076}(PO_4)_2 : Sn_{0.020}Mn_{0.016}$ |
| VII | $Sr_{2.550}\square_{0.0460}Mg_{0.285}Ca_{0.076}(PO_4)_2 : Sn_{0.020}Mn_{0.023}$ |
| VIII | $Sr_{2.541}\square_{0.0460}Mg_{0.285}Ca_{0.076}(PO_4)_2 : Sn_{0.020}Mn_{0.032}$ |
| IX | $Sr_{2.528}\square_{0.0460}Mg_{0.285}Ca_{0.076}(PO_4)_2 : Sn_{0.020}Mn_{0.045}$ |
| X | $Sr_{2.509}\square_{0.0460}Mg_{0.285}Ca_{0.076}(PO_4)_2 : Sn_{0.020}Mn_{0.064}$ |
| XI | $Sr_{2.483}\square_{0.0455}Mg_{0.285}Ca_{0.076}(PO_4)_2 : Sn_{0.020}Mn_{0.905}$ |
| XII | $Sr_{2.561}\square_{0.0460}Mg_{0.285}Ca_{0.076}(PO_4)_2 : \qquad Mn_{0.032}$ |
| XIII | $Sr_{2.519}\square_{0.1000}Mg_{0.285}Ca_{0.076}(PO_4)_2 : Sn_{0.020}$ |

*The non-stoichiometric factor in the above formulations, represented by the symbol $\square$ is given as the difference between the sum of the cation coefficients and 3.

The phosphor examples, with the exception of Examples XII and XIII were of approximately the same strontium, magnesium, calcium, and tin content but with increasing manganese content from a lower limit of 0.0005 atoms/mole in Example I to an upper limit of 0.0905 atoms/mole in Example XI. Example XII contains no tin for purposes of comparison, while Example XIII represents a prior art phosphor activated by tin alone.

To study the luminescence properties of the phosphors, a sample of each material was packed in an 11 mm diameter circular aluminum cavity and excited by a 2 μsec pulse from a General Radio Model 1531AB Strobotac. The light from this excitation source was restricted to a narrow band around 254 nm by means of a blocked interference filter.

The emission from each excited phosphor was directed to the entrance of a Zeiss MM 12 quartz monochromator, and the spectrally dispersed emission detected at the monochromator output by means of a Hamamatsu Model R777 photomultiplier (PMT).

FIG. 1 shows the time-resolved emission of the typical manganese-free prior art phosphor of Example XIII obtained by displaying the PMT output on an oscilloscope. FIG. 1 shows the short-lived emission spike 10 produced by the excited tin, followed by a tail 12, essentially coincident with the baseline.

Figure 2:
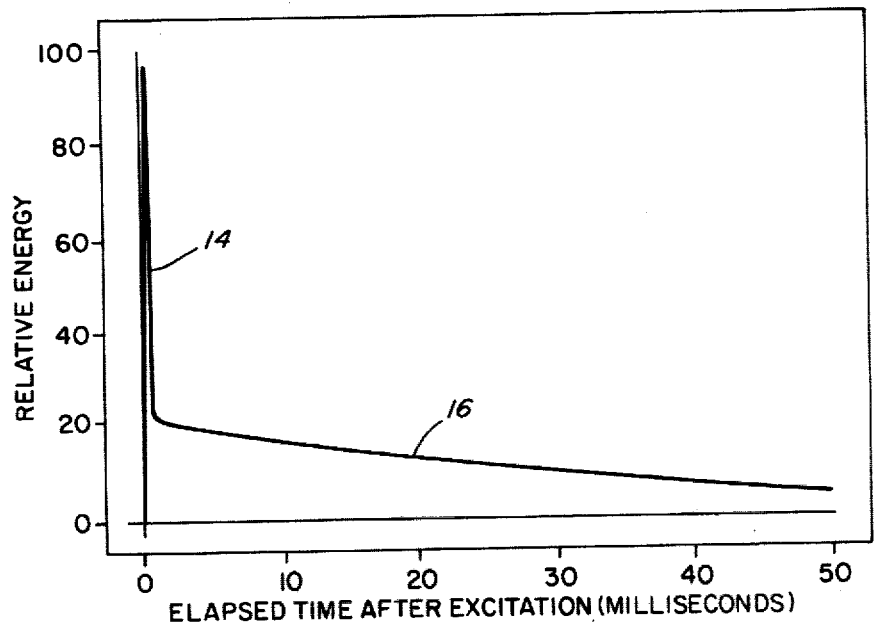
FIG. 2 is a plot of the emission versus time of a tin-manganese coactivated modified strontium orthophosphate phosphor in accordance with the present invention.

FIG. 2 shows, in contrast, the corresponding emission of Example VIII, a tin and manganese coactivated phosphor in accordance with this invention. FIG. 2 shows the tin emission spike 14 followed by the tail 16 of the slow exponentially decaying manganese emission. The decay constant for the manganese was found to be about 40 msec, or roughly three orders of magnitude longer than that of the tin emission. The tin-manganese coactivated modified strontium orthophosphate phosphors of this invention thus represent improved materials having longer fluorescence decay lifetimes than known strontium or calcium orthophosphate phosphors activated by tin alone.

Figure 3:
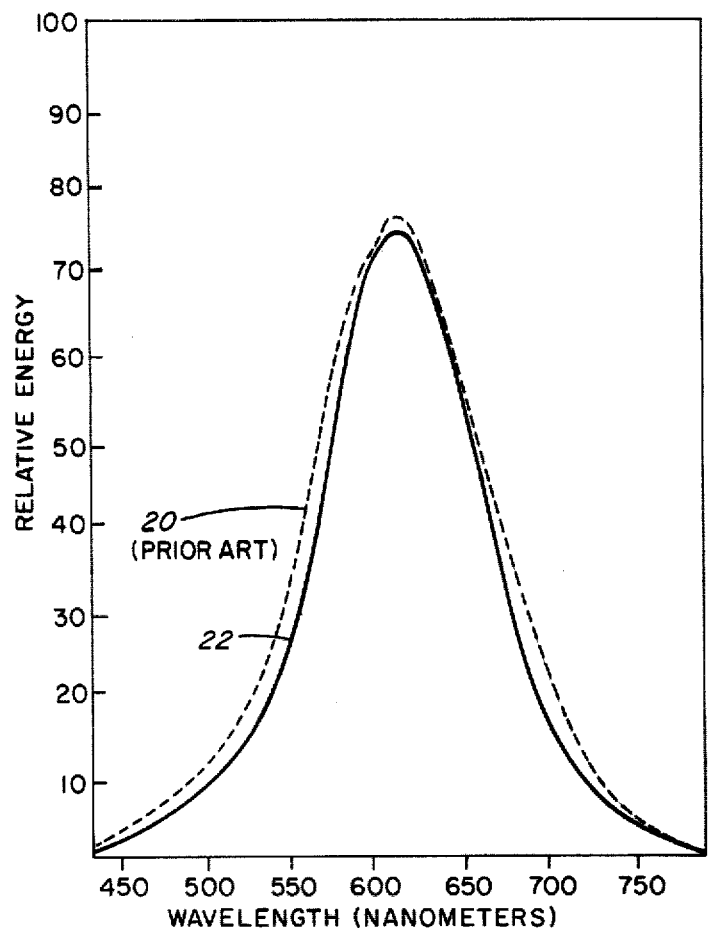
FIG. 3 is a plot of emission versus wavelength for a typical prior art tin activated strontium orthophosphate phosphor and a tin-manganese coactivated modified strontium orthophosphate phosphors in accordance with the present invention.

FIG. 3 illustrates in curve 20 the primary visible emission band of the prior art tin activated phosphor of Example XIII. Curve 22 illustrates the emission of Example VIII formulated in accordance with the first embodiment of this invention. The curve 22 shows very little color shift from the curve 20 of the prior art tin activated phosphor.

Figure 4:
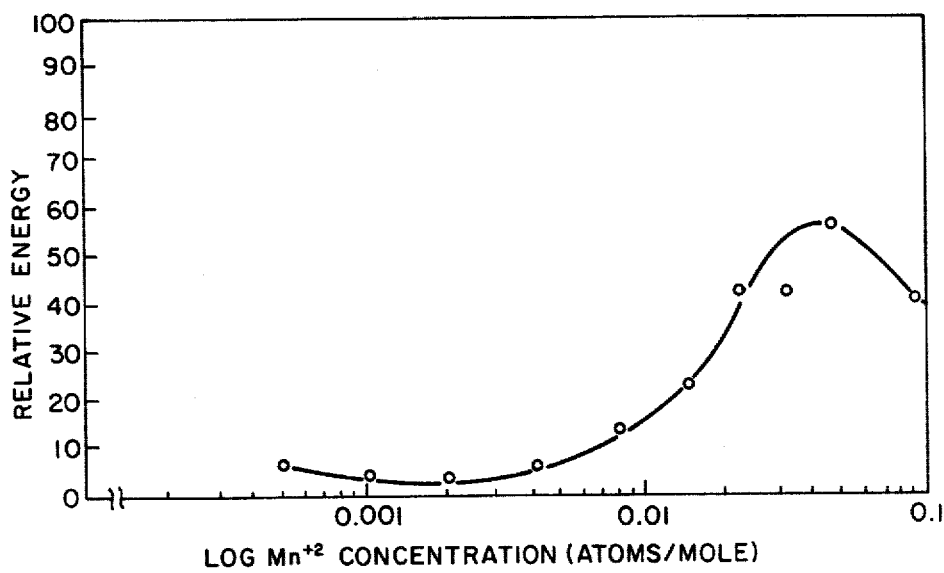
FIG. 4 is a semi-logarithmic plot of emission versus manganese ion content of tin-manganese coactivated modified strontium orthophosphate phosphors in accordance with the present invention.

In FIG. 4, the influence of manganese content on the intensity of the delayed fluorescence of phosphors of this invention is shown. The data plotted in FIG. 4 were obtained by integration of the emission output of Examples I-XII by means of a PAR Model 160 boxcar integrator, with the excitation source and detector as detailed above. The phosphor emission was integrated over the time window from 200 μsec to 1700 μsec following excitation so as to blank out any contribution by the tin emission which lasts 60-70 μsec. FIG. 4 illustrates an increase in the delayed fluorescence of phosphors of this invention with increasing manganese content up to about 0.032 atoms/mole, followed by a decrease at higher manganese concentrations.

The enhanced fluorescence decay lifetime of phosphors in accordance with the first embodiment of this invention, coupled with their similar color to known tin activated alkaline earth orthophosphates, makes them particularly useful in applications where the flicker of phosphors activated by tin alone is undesirable, but where the color of a tin-activated phosphor is required. Applications include fluorescent lamps operated on alternating current, monitor and display cathode ray tubes and the like.

Figure 5:
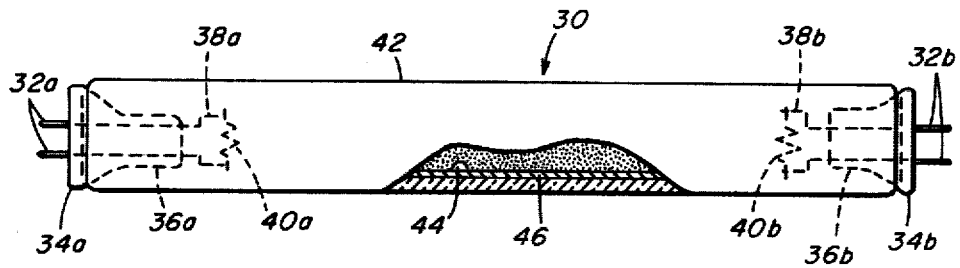
FIG. 5 is a lateral representation, partially cut-away, of a fluorescent lamp in accordance with the present invention.

A second aspect of the present invention is illustrated in FIG. 5. A fluorescent lamp 30 comprises a transparent, light-transmitting sealed envelope 42, preferably glass. The envelope 42 is fitted at each end with mounts comprising electrodes 40a and 40b, re-entrant stem presses 36a and 36b and lead-in conductors 38a and 38b. Base caps 34a and 34b and pins 32a and 32b are provided at each end of the envelope 42, together with a small charge of mercury 44 within the envelope 42.

The inner surface of envelope 42 is coated with a phosphor layer 46 which includes the tin-manganese coactivated modified strontium orthophosphate phosphor in accordance with this invention detailed above. The phosphor of this lamp has a sufficiently long decay lifetime to eliminate the visual appearance of flicker in the lamp, even when the lamp is operated on 50 Hz alternating current.

While there has been shown and described what are at present believed to be the preferred embodiments of the present invention, it will be obvious to those skilled in the art that various changes and modifications may be made therein without departing from the scope of the invention as defined by the appended claims.

What is claimed is:

1. A luminescent phosphor composition consisting essentially of a non-stoichiometric tin and manganese coactivated alkaline earth orthophosphate represented by the formula:

$$Sr_{(3-v-w-x-y-z)}\square_v Mg_w Ca_x(PO_4)_2:Sn_y Mn_z$$

wherein $\square$ represents the non-stoichiometry factor, and:
$0.001 \leq v \leq 0.05$
$0.180 \leq w \leq 0.35$
$0 \leq x \leq 0.08$
$0.015 \leq y \leq 0.05$
$0.0005 \leq z \leq 0.0905$ said luminescent phosphor composition emitting orange emission when excited, and characterized by extended fluorescence decay lifetime.

2. A luminescent phosphor composition in accordance with claim 1 wherein $0.03 \leq z \leq 0.05$.

3. A luminescent phosphor composition in accordance with claim 2 wherein z is 0.032.

4. A luminescent phosphor composition in accordance with claim 1 wherein $0.180 \leq w \leq 0.250$.

5. A luminescent phosphor composition in accordance with claim 2 wherein $0.180 \leq w \leq 0.250$.

6. A fluorescent lamp comprising:
a sealed light-transmitting tubular envelope;
a discharge-sustaining filling contained within said envelope;
electrodes disposed within said envelope and operable when energized to sustain a discharge therebetween to generate ultraviolet radiations including a substantial proportion of 254 nm radiations; and
a phosphor coating disposed on the interior surface of said envelope, said phosphor coating including a composition consisting essentially of a non-stoichiometric tin and manganese coactivated non-stoichiometric alkaline earth orthophosphate represented by the formula

$$Sr_{(3-v-w-x-y-z)}\square_v Mg_w Ca_x(PO_2)_4:Sn_y Mn_z$$

wherein $\square$ represents the non-stoichiometric factor and
$0.001 \leq v \leq 0.05$
$0.180 \leq w \leq 0.35$
$0 \leq x \leq 0.08$
$0.015 \leq y \leq 0.05$
$0.0005 \leq z \leq 0.0905$.

7. The combination in accordance with claim 6 wherein $0.03 \leq z \leq 0.05$.

8. The combination in accordance with claim 7 wherein z is 0.032.

9. The combination in accordance with claim 7 wherein $0.180 \leq w \leq 0.250$.

10. The combination in accordance with claim 6 wherein $0.180 \leq w \leq 0.250$.

* * * * *